(12) United States Patent
Shinohara et al.

(10) Patent No.: US 10,998,564 B2
(45) Date of Patent: May 4, 2021

(54) FUEL CELL SYSTEM

(71) Applicant: NISSAN MOTOR CO., LTD., Yokohama (JP)

(72) Inventors: Mikiya Shinohara, Kanagawa (JP); Masanari Yanagisawa, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/634,259

(22) PCT Filed: Jul. 28, 2017

(86) PCT No.: PCT/JP2017/027548
§ 371 (c)(1),
(2) Date: Jan. 27, 2020

(87) PCT Pub. No.: WO2019/021481
PCT Pub. Date: Jan. 31, 2019

(65) Prior Publication Data
US 2020/0373593 A1    Nov. 26, 2020

(51) Int. Cl.
| | |
|---|---|
| *H01M 8/04* | (2016.01) |
| *H01M 8/04082* | (2016.01) |
| *H01M 8/1246* | (2016.01) |
| *H01M 8/2475* | (2016.01) |
| *H01M 8/124* | (2016.01) |

(52) U.S. Cl.
CPC ..... *H01M 8/04201* (2013.01); *H01M 8/1246* (2013.01); *H01M 8/2475* (2013.01); *H01M 2008/1293* (2013.01); *H01M 2250/20* (2013.01)

(58) Field of Classification Search
CPC .............. H01M 8/04201; H01M 8/2475
USPC ........................................ 429/513
See application file for complete search history.

(56) References Cited

U.S. PATENT DOCUMENTS

2016/0133955 A1* 5/2016 Ozawa ............ H01M 8/0432
  429/439
2017/0149108 A1   5/2017 Gorintin et al.

FOREIGN PATENT DOCUMENTS

| | | |
|---|---|---|
| CN | 106716698 A | 5/2017 |
| EP | 2639875 A1 | 9/2013 |
| JP | 2006-086017 A | 3/2006 |
| JP | 2009-266608 A | 11/2009 |
| JP | 2012-028182 A | 2/2012 |
| JP | 2013-175448 A | 9/2013 |
| JP | 2013-191318 A | 9/2013 |
| JP | 2017-16940 A | 1/2017 |
| WO | WO 2012/128368 A1 | 9/2012 |

* cited by examiner

*Primary Examiner* — James M Erwin
(74) *Attorney, Agent, or Firm* — Foley & Lardner LLP

(57) ABSTRACT

Provided is a fuel cell system including a fuel cell module that includes a fuel cell and a reformer. The fuel cell system includes: a housing including a high temperature chamber in which the fuel cell module is disposed, and a low temperature chamber in which a gas supply system configured to supply a fuel and an oxidant to the fuel cell module is disposed; and a heat insulating partition wall that partitions a section of the housing to define the high temperature chamber and the low temperature chamber and that is formed with supply passages configured to allow supply of the fuel and the oxidant to the fuel cell module by the gas supply system.

14 Claims, 9 Drawing Sheets

FUEL CELL SYSTEM

TECHNICAL FIELD

The present invention relates to a fuel cell system.

BACKGROUND ART

In a fuel cell system including a fuel cell that operates at a relatively high temperature, such as a solid oxide fuel cell (SOFC: Solid Oxide Fuel Cell) or a molten carbonate fuel cell, a fuel cell module including the fuel cell and a peripheral device such as a reformer for use in the operation of the fuel cell is housed in a heat insulator for suppressing heat dissipation to the outside.

For example, WO2012-128368 proposes one example of a fuel cell system in which a fuel cell module including a fuel cell and a reformer is housed in a heat insulator. Further, in this fuel cell system, an airtight housing surrounding the heat insulator is provided in terms of further suppressing heat dissipation to the outside. Sealants are provided in holes of the housing that are provided for allowing piping and wiring to the fuel cell module, thereby suppressing heat dissipation through the holes to the outside.

SUMMARY OF INVENTION

In the fuel cell system of WO2012-128368, since the heat insulator is entirely surrounded by the airtight housing, the heat that cannot be insulated by the heat insulator to leak out therefrom stays in an airtight space between the heat insulator and the housing. Therefore, in order to protect from heat damage a heat protection component such as a pipe disposed in this airtight space, a ventilation device such as an air blower is separately provided for ventilating the airtight space. Therefore, there has been a problem that the system configuration becomes complicated, leading to an increase in cost.

The present invention has been made in view of such circumstances, and an object thereof is to provide a fuel cell system that can protect a heat protection component from the heat generated by a fuel cell module in a heat insulator, while suppressing an increase in cost.

An aspect of the present invention provides a fuel cell system having a fuel cell module including a fuel cell. The fuel cell system includes a housing including a high temperature chamber in which the fuel cell module is disposed, and a low temperature chamber in which a gas supply system configured to supply a fuel and an oxidant to the fuel cell module is disposed, and a heat insulating partition wall partitioning a section of the housing to define the high temperature chamber and the low temperature chamber, the heat insulating partition wall formed with supply passages configured to allow supply of the fuel and the oxidant to the fuel cell module by the gas supply system.

DESCRIPTION OF THE EMBODIMENTS

Hereinafter, embodiments of the present invention will be described with reference to the drawings.

First Embodiment

Figure 1:
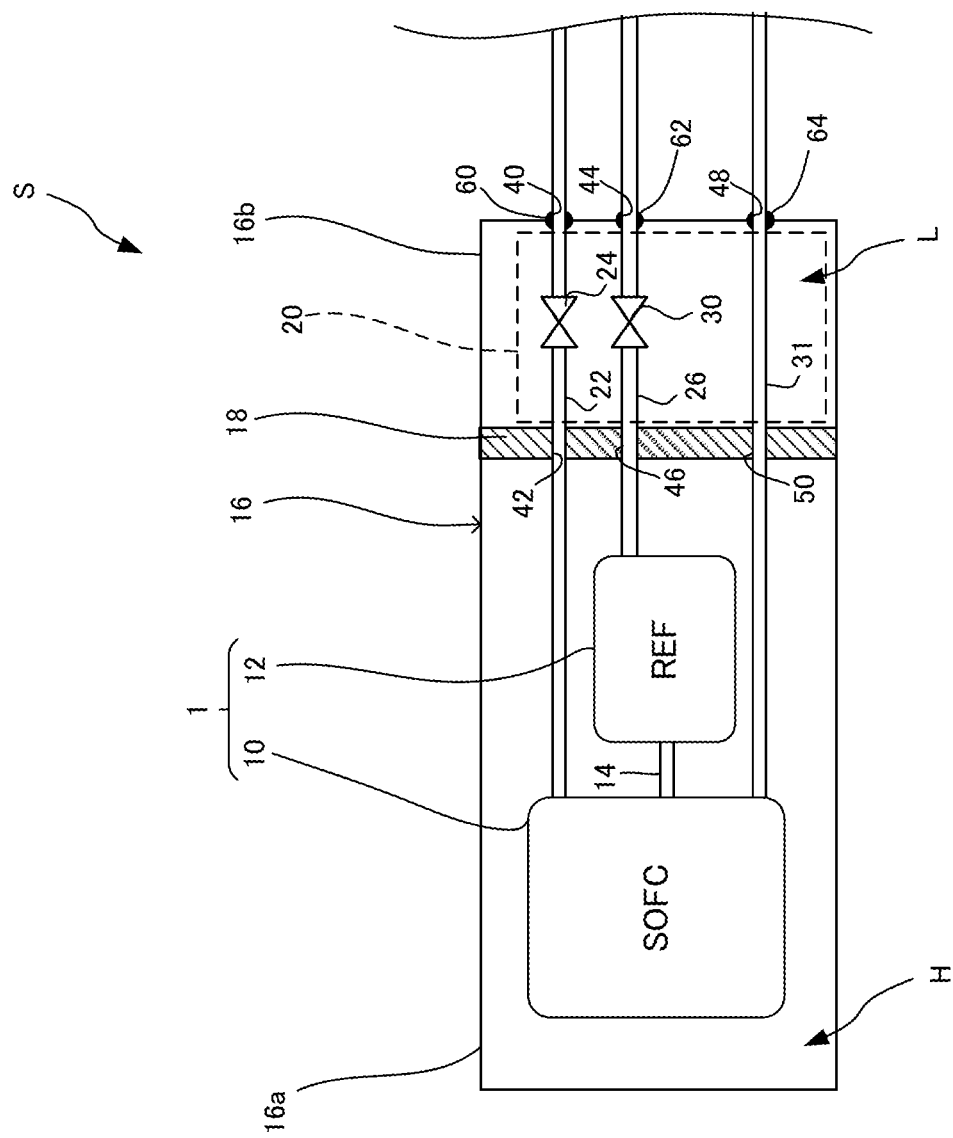
FIG. 1 is a diagram for explaining the configuration of a fuel cell system according to a first embodiment.

FIG. 1 illustrates the configuration of a fuel cell system S according to a first embodiment of the present invention.

The fuel cell system S according to this embodiment is installed, for example, in a vehicle or the like. As illustrated, the fuel cell system S includes a fuel cell stack 10 as a fuel cell and a reformer 12 that constitute a fuel cell module 1.

The fuel cell stack 10 is formed by stacking a plurality of fuel cells or fuel-cell unit cells. In this embodiment, the individual fuel-cell unit cells serving as a power generation source are each a solid oxide fuel cell (SOFC: Solid Oxide Fuel Cell). That is, the fuel cell stack 10 generates electricity, for example, at a suitable operating temperature of 600° C. to 800° C. by being supplied with a fuel and an oxidant (air).

Using a reforming catalyst, the reformer 12 reforms an unreformed fuel supplied from a fuel storage portion such as a fuel tank, not illustrated, to a fuel gas in a state suitable for use in the power generation of the fuel cell stack 10. The fuel reformed by the reformer 12 is, as described above, supplied to the fuel cell stack 10 through a reformed fuel supply passage 14.

The fuel cell system S of this embodiment includes a housing 16 having a high temperature chamber H and a low temperature chamber L. The housing 16 is formed into a generally rectangular shape, and wall portions forming the rectangular shape are made of a watertight material. Specifically, the housing 16 is made of, for example, stainless steel or a desired metal material having watertightness and thermal conductivity similar to those of stainless steel.

In the fuel cell system S of this embodiment, the housing 16 is disposed in a normal temperature region, i.e. in a temperature environment equivalent to the outside air. In the housing 16, a heat insulating partition wall 18 partitioning a section of the housing 16 is provided to define the high temperature chamber H and the low temperature chamber L. The heat insulating partition wall 18 is made of a heat insulating material such as, for example, silica-based ceramic, according to the required heat insulation performance. In particular, the heat insulating partition wall 18 of this embodiment is made of a material having a lower thermal conductivity than the material forming the housing 16.

More specifically, the high temperature chamber H is configured as a space in the housing 16 that is defined by the heat insulating partition wall 18 and a high temperature chamber wall portion 16a as a wall portion surrounding the fuel cell module 1. The low temperature chamber L is configured as a space in the housing 16 that is separated from the high temperature chamber wall portion 16a by the heat insulating partition wall 18. That is, the low temperature chamber L is configured as a space that is defined by the heat insulating partition wall 18 and a low temperature chamber wall portion 16b forming the housing 16.

The heat insulating partition wall 18 of this embodiment is configured to have lower heat transfer performance than the high temperature chamber wall portion 16a and the low temperature chamber wall portion 16b forming the housing 16. More specifically, the heat insulating partition wall 18 is configured to have desired heat transfer performance lower than the high temperature chamber wall portion 16a and the low temperature chamber wall portion 16b by properly adjusting its thickness, the area of its heat transfer surface, and its constituent material (thermal conductivity). Details of a method of designing the housing 16 and the heat insulating partition wall 18 in consideration of the heat transfer performance will be described later.

In the low temperature chamber L, a gas supply system 20 that supplies a fuel gas (alcohol vapor, hydrocarbon-based gas such as methane, or mixture of hydrocarbon-based gas and hydrogen gas) and air as an oxidant to the fuel cell stack 10 and the reformer 12 is disposed.

The gas supply system 20 of this embodiment includes an air pipe 22 as an oxidant pipe for supplying air from a non-illustrated air supply source to the fuel cell stack 10, an air flow rate control valve 24 provided in the air pipe 22, a fuel pipe 26 for supplying a fuel gas from a non-illustrated fuel supply source to the reformer 12, a fuel flow rate control valve 30 provided in the fuel pipe 26, and a gas discharge pipe 31 for discharging a discharged gas (off-gas) from the fuel cell stack 10.

The air pipe 22 extends from the outside of the housing 16 to pass through a first air pipe passing hole 40 provided in the low temperature chamber wall portion 16b and through a second air pipe passing hole 42 provided in the heat insulating partition wall 18, thereby connecting the air supply source and a cathode inlet of the fuel cell stack 10 to each other.

The air flow rate control valve 24 provided in the air pipe 22 adjusts the flow rate of air supplied from the air supply source to the fuel cell stack 10 through the air pipe 22.

On the other hand, the fuel pipe 26 extends from the outside of the housing 16 to pass through a first fuel pipe passing hole 44 provided in the low temperature chamber wall portion 16b and through a second fuel pipe passing hole 46 provided in the heat insulating partition wall 18, thereby connecting the fuel supply source and the reformer 12 to each other.

The fuel flow rate control valve 30 provided in the fuel pipe 26 adjusts the flow rate of a fuel supplied from a fuel supply means such as a fuel tank or an evaporator, not illustrated, to the reformer 12 through the fuel pipe 26.

Further, the gas discharge pipe 31 is a pipe conduit for discharging a discharged gas from the fuel cell stack 10 to a non-illustrated discharged gas combustor or to the outside air. More specifically, the gas discharge pipe 31 passes through a first gas discharge pipe passing hole 48 provided in the low temperature chamber wall portion 16b of the housing 16 and through a second gas discharge pipe passing hole 50 provided in the heat insulating partition wall 18, thereby connecting the fuel cell stack 10 and the discharged gas combustor or the like to each other.

In this embodiment, watertight sealants 60, 62, 64 are respectively provided in the first air pipe passing hole 40 in the state where the air pipe 22 is inserted through, the first fuel pipe passing hole 44 in the state where the fuel pipe 26 is inserted through, and the first gas discharge pipe passing hole 48 in the state where the gas discharge pipe 31 is inserted through. The watertight sealants 60, 62, 64 are each configured by a relatively low-priced general-purpose sealant. The general-purpose sealant is, for example, a sealant such as a lip packing, a squeezed packing (O-ring), or a gasket for a vehicle.

That is, in this embodiment, by configuring that, as described above, the watertight sealants 60, 62, 64 are provided in the holes, provided in the low temperature chamber wall portion 16b of the watertight housing 16, through which the pipes are inserted, the watertightness in the housing 16 can be realized without providing a sealant to the heat insulating partition wall 18 that can be subjected to a high temperature.

Next, a description will be given of one example of a method of designing the housing 16 and the heat insulating partition wall 18 in consideration of the transfer performance in the fuel cell system S configured as described above.

Figure 2A:
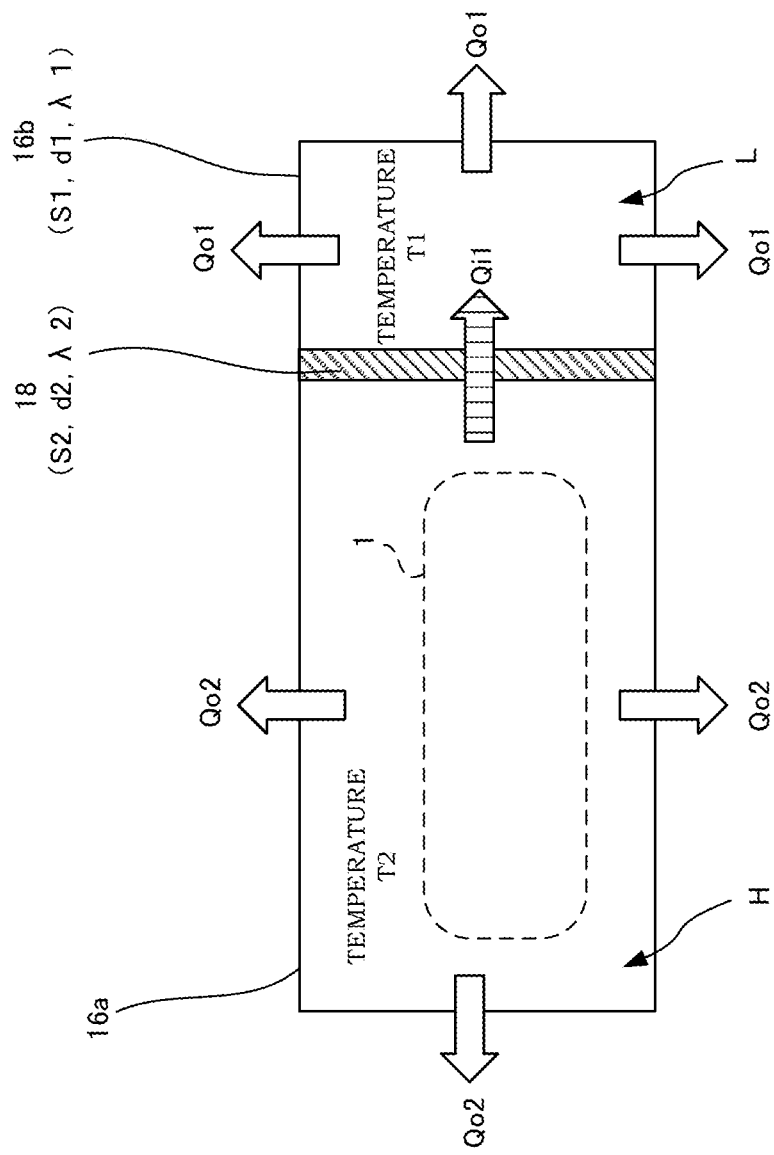
FIG. 2A is a diagram schematically illustrating the heat that flows into and out of a high temperature chamber and a low temperature chamber.
Figure 2B:
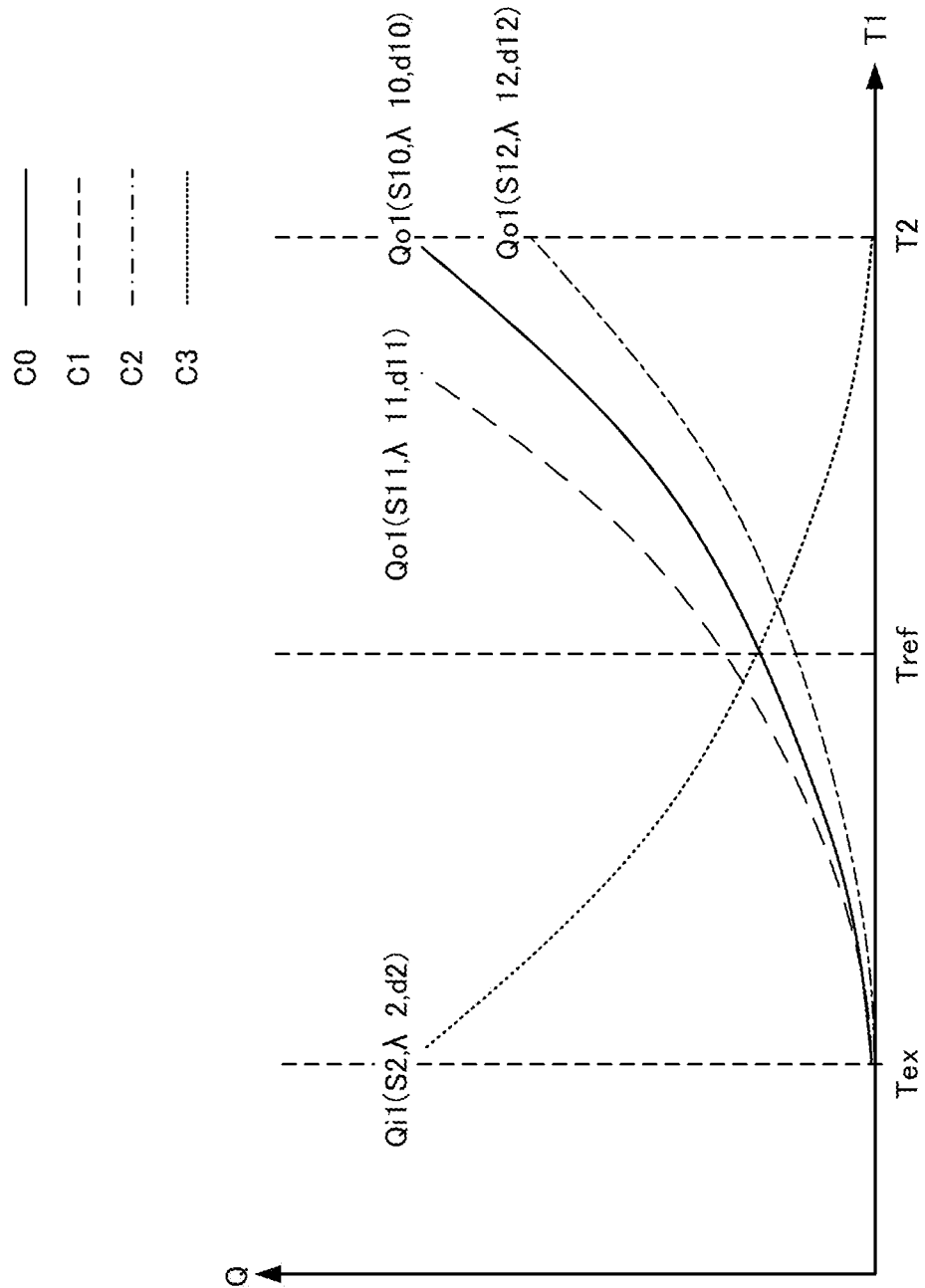
FIG. 2B is a diagram for explaining one example of a method of designing the low temperature chamber.

FIGS. 2A and 2B are diagrams for explaining a heat transfer model in the housing 16 and the heat insulating partition wall 18. In particular, FIG. 2A is a diagram for explaining manners of heat absorption and heat dissipation in the high temperature chamber H and the low temperature chamber L.

As illustrated in FIG. 2A, the heat radiated in the high temperature chamber H from the heat of the fuel cell module 1 is mainly transferred to the outside of the housing 16 and the inside of the low temperature chamber L through the high temperature chamber wall portion 16a and the heat insulating partition wall 18, respectively. Hereinafter, the quantity of heat that is released to the outside of the housing 16 from the high temperature chamber H through the high temperature chamber wall portion 16a will also be referred to as a "high temperature chamber outside release heat quantity Qo2". Further, the quantity of heat that is transferred to the low temperature chamber L from the high temperature chamber H through the heat insulating partition wall 18 will also be referred to as a "low temperature chamber inflow heat quantity Qi1".

Herein, the high temperature chamber outside release heat quantity Qo2 depends on the total heat transfer area of the high temperature chamber wall portion 16a, the thickness of the high temperature chamber wall portion 16a, the thermal conductivity of a material forming the high temperature chamber wall portion 16a, and the difference between a temperature in the high temperature chamber (hereinafter also referred to as a "high temperature chamber temperature T2") and a temperature outside the housing 16 (hereinafter also referred to as an "outside air temperature Tex").

The low temperature chamber inflow heat quantity Qi1 depends on the heat transfer area of the heat insulating partition wall 18 (hereinafter also referred to as a "heat insulating partition wall area S2"), the thickness of the heat insulating partition wall 18 (hereinafter also referred to as a "heat insulating partition wall thickness d2"), the thermal conductivity of a material forming the heat insulating partition wall 18 (hereinafter also referred to as a "heat insulating partition wall thermal conductivity λ2"), and the difference between a temperature in the low temperature chamber (hereinafter also referred to as a "low temperature chamber temperature T1") and the outside air temperature Tex.

Further, the heat that is transferred to the low temperature chamber L from the high temperature chamber H through the heat insulating partition wall 18 is released to the outside of the housing 16 through the low temperature chamber wall portion 16b. Hereinafter, the quantity of heat that is released to the outside of the housing 16 from the low temperature chamber L through the low temperature chamber wall portion 16b will also be referred to as a "low temperature chamber outside release heat quantity Qo1".

Herein, the low temperature chamber outside release heat quantity Qo1 depends on the total heat transfer area of the low temperature chamber wall portion 16b (hereinafter also referred to as a "low temperature chamber housing wall area S1"), the thickness of the low temperature chamber wall portion 16b (hereinafter also referred to as a "low temperature chamber housing wall thickness d1"), the thermal conductivity of a material forming the low temperature chamber wall portion 16b (hereinafter also referred to as a "housing wall thermal conductivity $\lambda 1$"), and the difference between the low temperature chamber temperature T1 and the outside air temperature Tex.

In this embodiment, the low temperature chamber wall portion 16b and the heat insulating partition wall 18 forming the low temperature chamber L are configured such that a target heat balance condition under which the low temperature chamber outside release heat quantity Qo1 becomes equal to or more than the low temperature chamber inflow heat quantity Qi1 is satisfied when the low temperature chamber temperature T1 is equal to or more than a predetermined temperature. More specifically, the low temperature chamber housing wall area S1, the low temperature chamber housing wall thickness d1, the housing wall thermal conductivity $\lambda 1$, the heat insulating partition wall area S2, the heat insulating partition wall thickness d2, and the heat insulating partition wall thermal conductivity $\lambda 2$ are determined to satisfy the target heat balance condition.

FIG. 2B is one example of a map showing the relationships between the low temperature chamber temperature T1 and the low temperature chamber outside release heat quantity Qo1 and between the low temperature chamber temperature T1 and the low temperature chamber inflow heat quantity Qi1. Hereinafter, for the brevity of description, it is assumed that the outside air temperature Tex or the high temperature chamber temperature T2 does not change.

In FIG. 2B, curves of the low temperature chamber outside release heat quantity Qo1 in three states where combinations of values of the low temperature chamber housing wall area S1, the housing wall thermal conductivity $\lambda 1$, and the low temperature chamber housing wall thickness d1 differ from each other are illustrated. Specifically, a curve C0 indicating the change of the low temperature chamber outside release heat quantity Qo1 (S1$_0$, $\lambda 1_0$, d1$_0$) with respect to the low temperature chamber temperature T1 in the case of the low temperature chamber housing wall area S1=S1$_0$, the housing wall thermal conductivity $\lambda 1=\lambda 1_0$, and the low temperature chamber housing wall thickness d1=d1$_0$ is illustrated by a solid line.

Further, a curve C1 indicating the change of the low temperature chamber outside release heat quantity Qo1 (S1$_1$, $\lambda 1_1$, d1$_1$) with respect to the low temperature chamber temperature T1 in the case of the low temperature chamber housing wall area S1=S1$_1$, the housing wall thermal conductivity $\lambda 1=\lambda 1_1$, and the low temperature chamber housing wall thickness d1=d1$_1$ is illustrated by a broken line. Further, a curve C2 indicating the change of the low temperature chamber outside release heat quantity Qo1 (S1$_2$, $\lambda 1_2$, d1$_2$) with respect to the low temperature chamber temperature T1 in the case of the low temperature chamber housing wall area S1=S1$_2$, the housing wall thermal conductivity $\lambda 1=\lambda 1_2$, and the low temperature chamber housing wall thickness d1=d1$_2$ is illustrated by a dash-dot line.

Further, in FIG. 2B, a curve C3 indicating the change of the low temperature chamber inflow heat quantity Qi1 (S2, $\lambda 2$, d2) with respect to the low temperature chamber temperature T1 is illustrated by a dotted line.

As illustrated, regardless of the values of the low temperature chamber housing wall area S1, the housing wall thermal conductivity $\lambda 1$, and the low temperature chamber housing wall thickness d1, the low temperature chamber outside release heat quantity Qo1 (S1, $\lambda 1$, d1) takes a smaller value as the low temperature chamber temperature T1 decreases (approaches the outside air temperature Tex), and takes a greater value as the low temperature chamber temperature T1 increases (approaches the high temperature chamber temperature T2).

That is, as the low temperature chamber temperature T1 approaches the outside air temperature Tex, the temperature gradient between the low temperature chamber L and the outside air of the housing 16 decreases so that the low temperature chamber outside release heat quantity Qo1 (S1, $\lambda 1$, d1) also decreases. On the other hand, as the low temperature chamber temperature T1 approaches the high temperature chamber temperature T2, the difference between the low temperature chamber temperature T1 and the outside air temperature Tex increases. Therefore, as the low temperature chamber temperature T1 approaches the high temperature chamber temperature T2, the temperature gradient between the low temperature chamber L and the outside of the housing 16 increases so that the low temperature chamber outside release heat quantity Qo1 (S1, $\lambda 1$, d1) increases.

Further, as illustrated by the curves C0 to C2, the sensitivity of the low temperature chamber outside release heat quantity Qo1 (S1, $\lambda 1$, d1) in response to a change in the value of the low temperature chamber temperature T1 differs according to the values of the low temperature chamber housing wall area S1, the housing wall thermal conductivity $\lambda 1$, and the low temperature chamber housing wall thickness d1.

For example, as the low temperature chamber housing wall area S1 increases, the quantity of heat transfer to the outside of the housing 16 through the low temperature chamber wall portion 16b increases so that the low temperature chamber outside release heat quantity Qo1 (S1, $\lambda 1$, d1) increases. Likewise, as the housing wall thermal conductivity $\lambda 1$ increases, the low temperature chamber outside release heat quantity Qo1 (S1, $\lambda 1$, d1) increases. Further, as the low temperature chamber housing wall thickness d1 increases, the quantity of heat transfer to the outside of the housing 16 through the low temperature chamber wall portion 16b decreases so that the low temperature chamber outside release heat quantity Qo1 (S1, $\lambda 1$, d1) decreases. Therefore, according to the values of the low temperature chamber housing wall area S1, the housing wall thermal conductivity $\lambda 1$, and the low temperature chamber housing wall thickness d1, the low temperature chamber outside release heat quantity Qo1 (S1, $\lambda 1$, d1) takes different states as appropriate as illustrated by the curves C0 to C2 in FIG. 2B.

Further, regardless of the values of the heat insulating partition wall area S2, the heat insulating partition wall thermal conductivity $\lambda 2$, and the heat insulating partition wall thickness d2, the low temperature chamber inflow heat quantity Qi1 (S2, $\lambda 2$, d2) takes a smaller value as the low temperature chamber temperature T1 increases (approaches the high temperature chamber temperature T2), and takes a greater value as the low temperature chamber temperature T1 decreases (approaches the outside air temperature Tex).

That is, as the low temperature chamber temperature T1 approaches the high temperature chamber temperature T2, the temperature gradient between the low temperature chamber L and the high temperature chamber H decreases so that the low temperature chamber inflow heat quantity Qi1 (S2, λ2, d2) also decreases. On the other hand, as the low temperature chamber temperature T1 approaches the outside air temperature Tex, the difference between the low temperature chamber temperature T1 and the high temperature chamber temperature T2 increases. Therefore, as the low temperature chamber temperature T1 approaches the outside air temperature Tex, the temperature gradient between the low temperature chamber L and the high temperature chamber H increases so that the low temperature chamber inflow heat quantity Qi1 (S2, λ2, d2) increases.

Further, although the illustration is omitted, the low temperature chamber inflow heat quantity Qi1 (S2, λ2, d2) also takes a plurality of states where the sensitivity thereof in response to a change in the value of the low temperature chamber temperature T1 differs according to the values of the heat insulating partition wall area S2, the heat insulating partition wall thermal conductivity λ2, and the heat insulating partition wall thickness d2.

Further, as a reference temperature Tref that is determined in this embodiment, use is made of an upper limit value of the low temperature chamber temperature T1 that is allowed in terms of heat resistance in the gas supply system 20 in the low temperature chamber L, or a value obtained by subtracting a predetermined margin from the upper limit value.

Therefore, in this embodiment, in terms of the heat resistant protection of the gas supply system 20, the low temperature chamber housing wall area S1, the housing wall thermal conductivity λ1, the low temperature chamber housing wall thickness d1, the heat insulating partition wall area S2, the heat insulating partition wall thermal conductivity λ2, and the heat insulating partition wall thickness d2 are determined so that the low temperature chamber outside release heat quantity Qo1 (S1, λ1, d1) becomes equal to or more than the low temperature chamber inflow heat quantity Qi1 (S2, λ2, d2) in a region where the low temperature chamber temperature T1 becomes equal to or more than the reference temperature Tref, thereby maintaining the low temperature chamber temperature T1 at the reference temperature Tref or less.

For example, when the heat insulating partition wall area S2, the heat insulating partition wall thickness d2, and the heat insulating partition wall thermal conductivity λ2 are determined, the low temperature chamber inflow heat quantity Qi1 (S2, λ2, d2) according to the low temperature chamber temperature T1 is determined as the curve C3 in the figure. Taking this into account, the low temperature chamber housing wall area S1, the low temperature chamber housing wall thickness d1, and the housing wall thermal conductivity λ1 are determined so that the low temperature chamber outside release heat quantity Qo1 (S1, λ1, d1) becomes equal to or more than the low temperature chamber inflow heat quantity Qi1 (S2, λ2, d2) in a region where the low temperature chamber temperature T1 becomes equal to or more than the reference temperature Tref.

Specifically, in FIG. 2B, referring to the low temperature chamber outside release heat quantities Qo1 indicated by the curve C0 and the curve C1, it can be determined that the low temperature chamber housing wall area $S1=S1_0$ or $S1_1$, the housing wall thermal conductivity $λ1=λ1_0$ or $λ1_1$, and the low temperature chamber housing wall thickness $d1=d1_0$ or $d1_1$.

In the above description, it is assumed that the outside air temperature Tex or the high temperature chamber temperature T2 does not change. In this regard, even in the case where the outside air temperature Tex or the high temperature chamber temperature T2 changes, curves of the low temperature chamber outside release heat quantity Qo1 and the low temperature chamber inflow heat quantity Qi1 in the graph illustrated in FIG. 2B can be determined as appropriate taking the change thereof. Therefore, using such curves that depend on values of the outside air temperature Tex or the high temperature chamber temperature T2, the low temperature chamber housing wall area S1, the housing wall thermal conductivity λ1, and the low temperature chamber housing wall thickness d1 can be determined as appropriate.

In the fuel cell system S of this embodiment described above, the fuel cell module 1 including the fuel cell stack 10 is disposed in the high temperature chamber H. The inside of the high temperature chamber H becomes a high temperature environment due to heat generation by the operation of the fuel cell module 1.

In particular, in this embodiment, the fuel cell stack 10 constituting the fuel cell module 1 is configured by the solid oxide fuel cells having an operating temperature of about 600° C. to 800° C., and the reformer 12 that reforms a fuel for the power generation in the solid oxide fuel cells also operates at a high temperature. Therefore, high heat is radiated by the operation of the fuel cell module 1 constituted by the fuel cell stack 10 and the reformer 12.

In this regard, according to the configuration of the fuel cell system S of this embodiment, since the high temperature chamber H is in contact with the outside air through the high temperature chamber wall portion 16a, part of the generated heat of the fuel cell module 1 can be released through the high temperature chamber wall portion 16a.

On the other hand, since the heat insulating partition wall 18 partitions the section of the housing 16 to provide the high temperature chamber H and the low temperature chamber L, the heat transfer from the high temperature chamber H to the low temperature chamber L is properly blocked. Therefore, the inflow of heat from the high temperature chamber H to the low temperature chamber L is suppressed so that it is possible to suppress heat damage to the gas supply system 20 in the low temperature chamber L.

Further, even if the heat transfer from the high temperature chamber H to the low temperature chamber L is not completely blocked by the heat insulating partition wall 18, the heat that flows into the low temperature chamber L is released to the outside through the low temperature chamber wall portion 16b having the higher heat transfer performance than the heat insulating partition wall 18. Therefore, the excessive stay of heat in the low temperature chamber L is suppressed.

Further, the housing 16 has the watertight structure, and the watertight sealants 60, 62, 64 are respectively provided in the first air pipe passing hole 40, the first fuel pipe passing hole 44, and the first gas discharge pipe passing hole 48 provided in the low temperature chamber wall portion 16b. Therefore, entry of water into the housing 16, particularly entry of water into the high temperature chamber H, is suppressed. Consequently, it is possible to suppress the occurrence of a problem due to the entry of water into the high temperature chamber H, such as a reduction in the temperature of the fuel cell stack 10 and the reformer 12 or oxidative degradation of the components forming them.

In particular, in this embodiment, the suppression of the entry of water into the high temperature chamber H described above is achieved by providing the watertight sealants 60, 62, 64 in the first air pipe passing hole 40, the first fuel pipe passing hole 44, and the first gas discharge pipe passing hole 48 of the low temperature chamber wall portion 16b forming the low temperature chamber L. That is, since the entry of water can be suppressed by providing the watertight sealants 60, 62, 64 to the low temperature chamber wall portion 16b forming the low temperature chamber L improved in heat dissipation, the heat resistance standard required for the watertight sealants 60, 62, 64 can be set low compared to the case where the sealants are provided at positions that are susceptible to the influence of the heat of the high temperature chamber H.

That is, since the watertight sealants 60, 62, 64 can each be configured by the above-described general-purpose sealant, i.e. not by a special material having high heat resistance, it is possible to suppress an increase in cost that is caused by providing the watertight sealants 60, 62, 64.

According to the fuel cell system S of this embodiment described above, the following operations and effects are exhibited.

The fuel cell system S of this embodiment includes the fuel cell module 1 including the fuel cell stack 10 and the reformer 12. Further, the fuel cell system S includes the housing 16 including the high temperature chamber H in which the fuel cell module 1 is disposed, and the low temperature chamber L in which the gas supply system 20 that supplies a fuel and air as an oxidant to the fuel cell module 1 is disposed. Further, in the fuel cell system S, the section of the housing 16 is partitioned to define the high temperature chamber H and the low temperature chamber L, and the heat insulating partition wall 18 formed with the second fuel pipe passing hole 46 and the second air pipe passing hole 42 as supply passages are provided. The supply passages respectively allow the supply of fuel and the supply of air to the fuel cell module 1 by the gas supply system 20.

Consequently, while suppressing the inflow of heat from the high temperature chamber H, in which the fuel cell module 1 as a heat source is disposed, to the low temperature chamber L by the heat insulating partition wall 18, the heat in the low temperature chamber L can be released through the low temperature chamber wall portion 16b of the housing 16 forming the low temperature chamber L. As a result, the excessive stay of heat that affects the gas supply system 20 disposed in the low temperature chamber L can be suppressed without providing a device such as an air blower in the low temperature chamber L. That is, while achieving simplification and cost reduction of the system configuration, it is possible to realize desired heat dissipation in the low temperature chamber L.

In the fuel cell system S of this embodiment, the housing 16 has the watertight structure.

Consequently, the entry of water into the housing 16 is suppressed. Therefore, the entry of water into the high temperature chamber H is properly suppressed without providing a sealant, for blocking the entry of water, to the heat insulating partition wall 18 in the housing 16. That is, the entry of water into the high temperature chamber H can be suppressed without providing an expensive sealant with high heat resistance to the heat insulating partition wall 18 that is subjected to a high temperature, and as a result, it is possible to suppress temperature drop and oxidative degradation of the fuel cell module 1 that are caused by contact of water with the fuel cell module 1.

In particular, in this embodiment, the gas supply system 20 includes the fuel pipe 26 that supplies a fuel to the fuel cell module 1 from the outside of the housing 16 through the low temperature chamber L, and the air pipe 22 as an oxidant pipe that supplies air to the fuel cell module 1 from the outside of the housing 16 through the low temperature chamber L. Further, the low temperature chamber wall portion 16b of the housing 16 is formed with the first fuel pipe passing hole 44 as a fuel pipe passing hole through which the fuel pipe 26 is inserted, and with the first air pipe passing hole 40 as an oxidant pipe passing hole through which the air pipe 22 is inserted. Further, the watertight sealants 60, 62 are provided to the first fuel pipe passing hole 44 and the first air pipe passing hole 40.

Consequently, since the watertightness of the first fuel pipe passing hole 44 and the first air pipe passing hole 40 can be further improved by the watertight sealants 60, 62, the entry of water into the housing 16, particularly the entry of water into the high temperature chamber H, can be suppressed more reliably.

In particular, in this embodiment, as described above, the watertight sealants 60, 62 are provided to the low temperature chamber wall portion 16b of the low temperature chamber L improved in heat dissipation. Therefore, since it is not necessary to use a special material having high heat resistance as the watertight sealants 60, 62, the watertight sealants 60, 62 can each be configured by a general-purpose sealant such as a lip packing, a squeezed packing (O-ring), or a gasket for a vehicle. As a result, while suppressing an increase in cost that is caused by configuring the watertight sealants 60, 62, the entry of water into the high temperature chamber H can be properly prevented.

On the other hand, in this embodiment, the low temperature chamber L is designed such that the target heat balance condition under which the low temperature chamber outside release heat quantity Qo1 being a release heat quantity from the low temperature chamber L to the outside of the housing 16 becomes equal to or more than the low temperature chamber inflow heat quantity Qi1 being an inflow heat quantity from the high temperature chamber H through the heat insulating partition wall 18 is satisfied when the temperature of the low temperature chamber L (low temperature chamber temperature T1) becomes equal to or more than the reference temperature Tref being a predetermined temperature.

That is, the heat dissipation performance of the low temperature chamber L exceeds the inflow heat quantity in a region where the low temperature chamber temperature T1 is equal to or more than the reference temperature Tref. Consequently, when the low temperature chamber temperature T1 has reached the reference temperature Tref, the heat balance in the low temperature chamber L shifts to the heat dissipation side so that an increase in the low temperature chamber temperature T1 is suppressed. As a result, it is possible to provide the configuration of the low temperature chamber L that can suppress an excessive temperature increase in the low temperature chamber temperature T1 without providing an additional ventilation device or the like for reducing the low temperature chamber temperature T1.

In particular, in this embodiment, the area of the low temperature chamber wall portion 16b of the housing 16 (low temperature chamber housing wall area S1), the thermal conductivity of the low temperature chamber wall portion 16b (housing wall thermal conductivity $\lambda1$), the thickness of the low temperature chamber wall portion 16b (low temperature chamber housing wall thickness d1), the area of the heat insulating partition wall 18 (heat insulating partition wall area S2), the thermal conductivity of the heat insulating partition wall 18 (heat insulating partition wall thermal conductivity $\lambda2$), and the thickness of the heat insulating partition wall 18 (heat insulating partition wall thickness d2) are determined to satisfy the target heat balance condition.

Consequently, a more specific configuration of the low temperature chamber L that can achieve the target heat balance condition is realized. In particular, the fuel cell system S that can achieve the target heat balance condition can be configured by properly adjusting at least one of the areas, the thermal conductivities, and the thicknesses according to the limitation of a space (volume) or the like of a vehicle in which the fuel cell system S is installed.

In particular, it is preferable to determine the ratio between the low temperature chamber housing wall area S1 and the heat insulating partition wall area S2 to satisfy the target heat balance condition.

Consequently, by properly setting the low temperature chamber housing wall area S1 and the heat insulating partition wall area S2, the low temperature chamber L that can keep the low temperature chamber temperature T1 equal to or less than the reference temperature Tref can be configured without depending on the heat insulation performances of the materials forming the high temperature chamber wall portion 16a and the heat insulating partition wall 18 and the thicknesses thereof. Therefore, since the versatility of materials that can be selected for forming the high temperature chamber wall portion 16a and the heat insulating partition wall 18 and the selectivity of the thicknesses thereof are broadened, it is possible to achieve a reduction in cost of the materials and to improve the design freedom.

More specifically, the heat dissipation in the low temperature chamber L increases as the low temperature chamber housing wall area S1 becomes greater than the heat insulating partition wall area S2, and conversely, the heat dissipation in the low temperature chamber L decreases as the low temperature chamber housing wall area S1 becomes smaller than the heat insulating partition wall area S2, and therefore, the low temperature chamber L that satisfies the target heat balance condition can be simply configured by properly adjusting the relative magnitude relationship between the low temperature chamber housing wall area S1 and the heat insulating partition wall area S2.

In the fuel cell system S of this embodiment, the fuel cells forming the fuel cell stack 10 are the solid oxide fuel cells. In the fuel cell system S including the fuel cell module 1 composed of the fuel cell stack 10 configured by the solid oxide fuel cells of which the operating temperature is high, the reformer 12, and so on as described above, it is important to improve the heat dissipation in the low temperature chamber L at low cost, and this requirement can be achieved with the configuration according to this embodiment described above.

Second Embodiment

Hereinafter, a second embodiment will be described. The same symbols will be assigned to like elements as those in the first embodiment, thereby omitting a description thereof.

Figure 3:
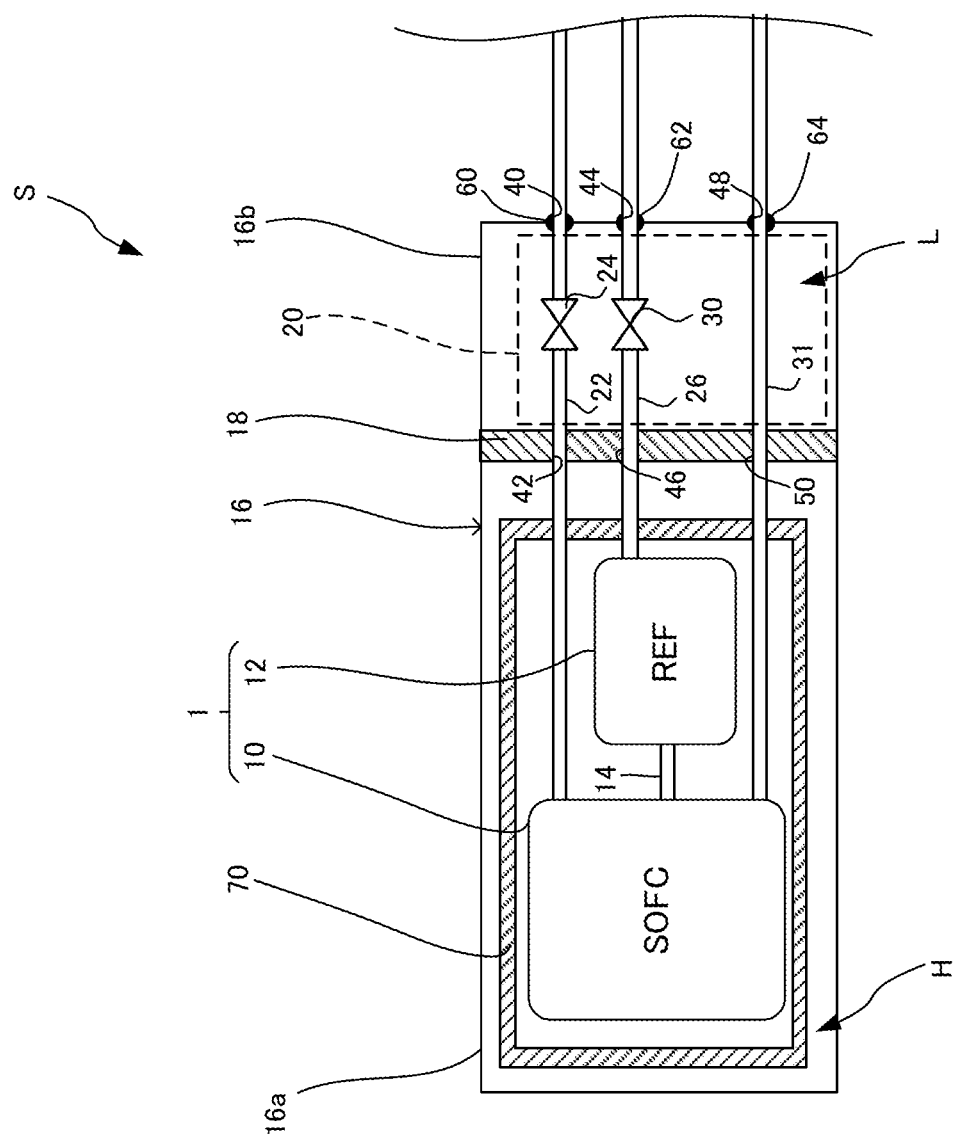
FIG. 3 is a diagram for explaining the configuration of a fuel cell system according to a second embodiment.

FIG. 3 is a diagram for explaining the configuration of a fuel cell system according to the second embodiment.

As illustrated, in the fuel cell system S of this embodiment, in addition to the configuration described in the first embodiment, a heat insulating coating member 70 is provided in the high temperature chamber H to surround the fuel cell module 1 constituted by the fuel cell stack 10 and the reformer 12.

The heat insulating coating member 70 is formed into a hollow generally rectangular shape, and the fuel cell module 1 is housed therein. With this configuration, the release of heat to the outside from the inside of the heat insulating coating member 70 housing the fuel cell module 1 is suppressed so that the heat loss due to a reduction in the temperature of the fuel cell module 1 is suppressed. That is, this means that the release of heat to a space between the high temperature chamber wall portion 16a and the heat insulating coating member 70 in the high temperature chamber H is suppressed. Therefore, the heat that flows into the low temperature chamber L from the high temperature chamber H through the heat insulating partition wall 18 can also be reduced, which contributes to further enhance the effect of suppressing the excessive stay of heat in the low temperature chamber L.

According to the fuel cell system S of this embodiment described above, the following operations and effects are exhibited.

In the fuel cell system S of this embodiment, the heat insulating coating member 70 surrounding the fuel cell module 1 is provided in the high temperature chamber H.

Consequently, while suppressing the heat loss of the fuel cell module 1, the inflow heat quantity from the high temperature chamber H to the low temperature chamber L through the heat insulating partition wall 18 can be further reduced so that it is possible to further enhance the effect of suppressing the excessive stay of heat in the low temperature chamber L.

Third Embodiment

Hereinafter, a third embodiment will be described. The same symbols will be assigned to like elements as those in the first embodiment or the second embodiment, thereby omitting a description thereof.

Figure 4:
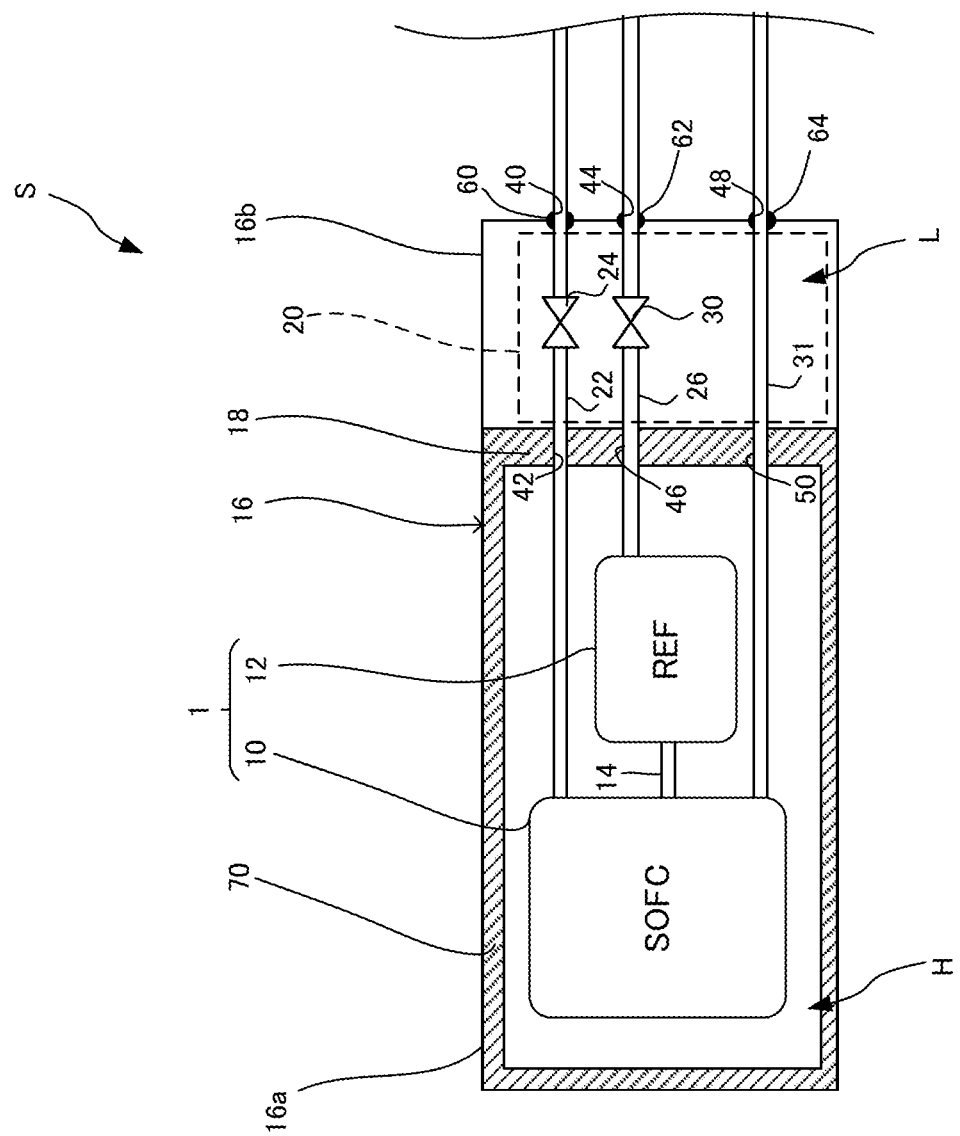
FIG. 4 is a diagram for explaining the configuration of a fuel cell system according to a third embodiment.

FIG. 4 is a diagram for explaining the configuration of a fuel cell system according to the third embodiment.

As illustrated, in this embodiment, in the heat insulating coating member 70 described in the second embodiment, a side portion facing the low temperature chamber L and forming a partial region of the heat insulating coating member 70 is configured as the heat insulating partition wall 18 described in the first embodiment. That is, the heat insulating partition wall 18 is formed integrally with the heat insulating coating member 70. Further, in this embodiment, a portion, other than the heat insulating partition wall 18, of the heat insulating coating member 70 is provided in close contact with an inner surface of the high temperature chamber wall portion 16a.

According to this embodiment, by forming the heat insulating coating member 70 and the heat insulating partition wall 18 integrally with each other, the heat insulating partition wall 18 can be configured simply and at low cost. That is, it is possible to properly suppress complication of work and an increase in material cost which are caused by forming the heat insulating coating member 70 and the heat insulating partition wall 18 of separate heat insulating materials.

Further, the portion, other than the heat insulating partition wall 18, of the heat insulating coating member 70 is provided in close contact with the inner surface of the high temperature chamber wall portion 16a. Consequently, the heat that cannot be insulated by the heat insulating coating member 70 is transferred to the high temperature chamber wall portion 16a with low heat insulation directly, i.e. not through a space, and released to the outside of the housing 16. Therefore, the function to release the heat in the high temperature chamber H to the outside of the housing 16 through the high temperature chamber wall portion 16a is further improved.

Further, in this embodiment, as illustrated, the heat insulating coating member 70 is formed such that the thickness of the heat insulating partition wall 18 and the thickness of the portion other than the heat insulating partition wall 18 differ from each other. In particular, the heat insulating partition wall 18 of the heat insulating coating member 70 is formed to be thicker than the other portion of the heat insulating coating member 70 by a predetermined thickness.

Consequently, the heat insulation in the heat transfer path to the low temperature chamber L through the heat insulating partition wall 18 is higher than the heat insulation in the heat transfer path to the outside of the housing 16 through the heat insulating coating member 70 and the high temperature chamber wall portion 16a. Therefore, even when the heat cannot be insulated by the heat insulating coating member 70 so as to leak out, the function to release the heat to the outside of the housing 16 without causing the heat to flow into the low temperature chamber L is exhibited more properly.

In this embodiment, the portion, other than the heat insulating partition wall 18, of the heat insulating coating member 70 is provided in close contact with the inner surface of the high temperature chamber wall portion 16a over substantially the entirety thereof. Consequently, the housing 16 also functions to support and reinforce the heat insulating coating member 70 to enhance the strength thereof. The support/reinforcement function achieved by the close contact of the heat insulating coating member 70 with the inner surface of the housing 16 as described above is particularly useful in the case where the fuel cell system S is installed in a moving body such as a vehicle in which the fuel cell system S may be subjected to external force such as vibration.

According to the fuel cell system S of this embodiment described above, the following operations and effects are exhibited.

In the fuel cell system S of this embodiment, the partial region of the heat insulating coating member 70 is configured as the heat insulating partition wall 18.

Consequently, compared to the case where the heat insulating coating member 70 and the heat insulating partition wall 18 are configured separately, the heat insulating partition wall 18 can be configured while suppressing complication of work and cost for configuring the fuel cell system S.

In the fuel cell system S of this embodiment, the heat insulating coating member 70 is provided in contact with the high temperature chamber wall portion 16a of the housing 16.

Consequently, the heat that cannot be insulated by the heat insulating coating member 70 is transferred to the high temperature chamber wall portion 16a with low heat insulation directly, i.e. not through a space, and released to the outside of the housing 16 at least in a region where the heat insulating coating member 70 and the high temperature chamber wall portion 16a are in contact with each other. Therefore, the function to release the heat in the high temperature chamber H to the outside of the housing 16 through the high temperature chamber wall portion 16a is further improved.

In this embodiment, the description has been given of the example where the portion, other than the heat insulating partition wall 18, of the heat insulating coating member 70 is provided in close contact with the inner surface of the high temperature chamber wall portion 16a over substantially the entirety thereof. However, not limited to this, it may be configured that a partial region of the portion, other than the heat insulating partition wall 18, of the heat insulating coating member 70 is in contact with the high temperature chamber wall portion 16a.

(Modification)

Hereinafter, a modification of the third embodiment will be described.

Figure 5:
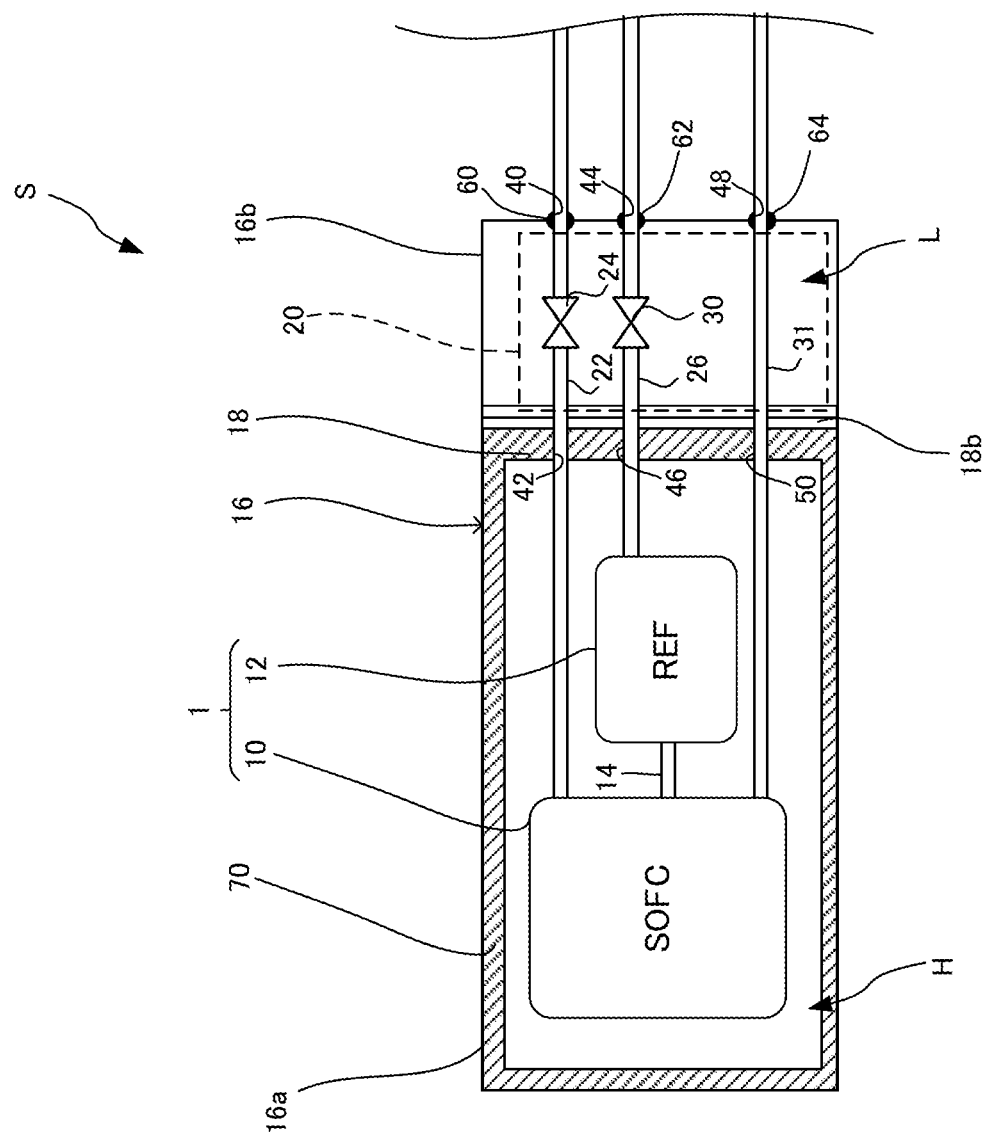
FIG. 5 is a diagram for explaining the configuration of a fuel cell system according to a modification of the third embodiment.

FIG. 5 is a diagram for explaining the modification of the third embodiment.

As illustrated, in this modification, in addition to the configuration of the third embodiment described above, the heat insulating partition wall 18 is provided with an air layer 18b. Consequently, the heat insulation to heat transfer from the high temperature chamber H to the low temperature chamber L can be further improved.

In particular, in this case, even when the heat insulating partition wall 18 and the other portion of the heat insulating coating member 70 are formed to the same thickness or the heat insulating partition wall 18 is formed to be relatively thin, the inflow of heat from the high temperature chamber H to the low temperature chamber L can be suppressed more reliably by the air layer 18b with high heat insulation performance. Therefore, even with the heat insulating coating member 70 in which the heat insulating partition wall 18 and the other portion are formed to the uniform thickness, it is possible to improve the design freedom while properly maintaining the function of suppressing the heat from the high temperature chamber H to the low temperature chamber L.

Fourth Embodiment

Hereinafter, a fourth embodiment will be described. The same symbols will be assigned to like elements as those in any of the first to third embodiments, thereby omitting a description thereof.

Figure 6:
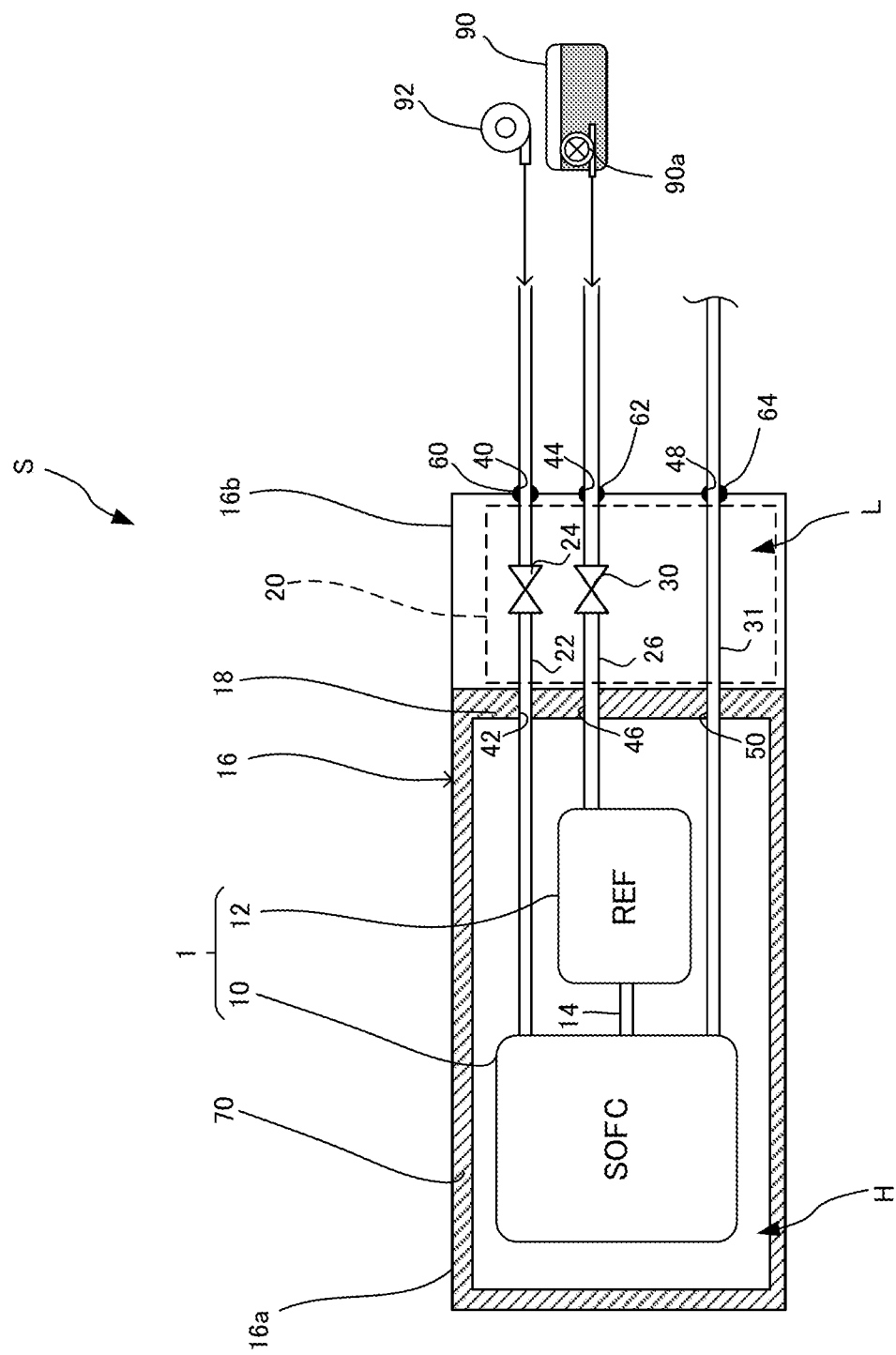
FIG. 6 is a diagram for explaining the configuration of a fuel cell system according to a fourth embodiment.

FIG. 6 is a diagram for explaining the configuration of a fuel cell system according to the fourth embodiment.

As illustrated, the fuel cell system S of this embodiment includes, in addition to the fuel cell system S of the third embodiment described in FIG. 4, a fuel tank 90 as a fuel supply device disposed outside the housing 16, and an air blower 92 as an oxidant supply device disposed outside the housing 16.

The fuel tank 90 stores therein a fuel in a liquid state. The fuel tank 90 is provided with a pump 90a that pumps out the fuel inside to the fuel pipe 26. The air blower 92 takes in the outside air and sends out the air to the air pipe 22.

The fuel tank 90 and the air blower 92 are disposed outside the housing 16, particularly at positions, where the influence of heat transfer from the housing 16 is small, in the fuel cell system S, preferably at positions in a low temperature environment equivalent to the outside air. That is, the temperatures of the fuel and the air that are delivered to the fuel pipe 26 and the air pipe 22 from the fuel tank 90 and the air blower 92 disposed in such a low temperature environment also become low relative to the temperature of the high temperature chamber H.

In this embodiment, such low-temperature fuel and air are supplied to the fuel cell module 1 through the low temperature chamber L. Therefore, even if the heat flows into the low temperature chamber L from the high temperature chamber H, an excessive temperature increase in the low temperature chamber L is suppressed due to cooling by the fuel pipe 26 and the air pipe 22 in which the low-temperature fuel and air flow.

According to the fuel cell system S of this embodiment described above, the following operations and effects are exhibited.

According to this embodiment, the fuel tank 90 as the fuel supply device that sends out the fuel to the fuel pipe 26, and the air blower 92 as the oxidant supply device that sends out the air to the air pipe 22 are disposed outside the housing 16.

That is, the fuel tank 90 and the air blower 92 serving as supply sources of fuel and air are disposed in a relatively low temperature region outside the housing 16. Consequently, the low-temperature fuel and air that are respectively delivered to the fuel pipe 26 and the air pipe 22 from the fuel tank 90 and the air blower 92, when passing through the low temperature chamber L, cool the inside of the low temperature chamber L so that it is possible to suppress an increase in the temperature thereof.

Further, conversely, the fuel and the air receiving the heat by cooling the inside of the low temperature chamber L increase in temperature and approach a suitable temperature when supplied to the fuel cell module 1 in the high temperature chamber H. Therefore, with the configuration of the fuel cell system S of this embodiment, it is possible to contribute to both the function to maintain the low temperature chamber L in a low temperature environment and the heating of fuel and air to a temperature suitable for supply to the fuel cell module 1. As a result, it also contributes to an improvement in energy efficiency in the fuel cell system S.

Further, the configuration of the fuel cell system S of this embodiment exhibits a more preferable effect when the fuel cell system S is installed in a vehicle. Specifically, when the fuel cell system S is installed in a vehicle, specifications of the fuel tank 90 and the air blower 92 are determined according to specifications, such as cruising distance and output, required per vehicle type.

Therefore, for example, when it is configured that the fuel tank 90 and the air blower 92 are disposed in the low temperature chamber L of the housing 16, specifications of the fuel cell system S are required to be changed according to the vehicle type. However, since the fuel tank 90 and the air blower 92 that are required to have different specifications per vehicle type are disposed outside the housing 16 in the fuel cell system S of this embodiment, it is possible to install the fuel cell system S in a vehicle only by applying the common-specification housing 16 and the common-specification fuel cell module 1 inside the housing 16 to a vehicle in which the fuel tank 90 and the air blower 92 of the specifications according to the vehicle type are installed in advance. That is, when installing the fuel cell system S in a vehicle, the versatility to the vehicle type or the like is improved, and therefore, it is more preferable in terms of productivity and cost.

While the embodiments of the present invention have been described above, the above-described embodiments only show part of application examples of the present invention and are not intended to limit the technical scope of the present invention to the specific configurations of the above-described embodiments. Various modifications and alterations can be made to the above-described embodiments within the scope of the matter recited in the claims.

The reference temperature Tref may be set to a desired value according to the situation, other than the upper limit value of the low temperature chamber temperature T1 that is allowed in terms of heat resistance in the gas supply system 20 in the low temperature chamber L, or the upper limit value. For example, the low temperature chamber temperature T1 may be set to a value significantly lower than the heat resistant upper limit value, thereby suppressing heat damage to the gas supply system 20 more reliably.

Further, in the above-described embodiments, the description has been given of the example where the fuel cell stack 10 is configured by the solid oxide fuel cells. However, the fuel cell stack 10 may be configured by another type of fuel cells that generate heat during operation, such as polymer electrolyte fuel cells, molten carbonate fuel cells, or phosphoric acid fuel cells.

The above-described embodiments and modification can be combined arbitrarily. For example, the setting of the areas, the thermal conductivities, and the thicknesses of the low temperature chamber wall portion 16b and the heat insulating partition wall 18 described in FIGS. 2A and 2B of the first embodiment can also be applied to the fuel cell systems S of the second to fourth embodiments. For example, in the fuel cell system S of the third embodiment illustrated in FIG. 5, the method described in FIGS. 2A and 2B can be performed in the same manner by using as a housing wall thermal conductivity $\lambda 1$ a total thermal conductivity $\lambda$total of a thermal conductivity $\lambda a$ of a material portion of the heat insulating partition wall 18 and a thermal conductivity $\lambda b$ of the air layer 18b. The total thermal conductivity $\lambda$total can be calculated, for example, by substituting known $\lambda a$ and $\lambda b$ to solve $(1/\lambda a)+(1/\lambda b)=(1/\lambda total)$. In the fourth embodiment illustrated in FIG. 6, the method described in FIGS. 2A and 2B can be performed in the same manner by correcting a low temperature chamber inflow heat quantity Qi1, such as subtracting therefrom a cooling quantity given to the low temperature chamber L from the fuel and the air in the fuel pipe 26 and the air pipe 22.

Further, in the above-described embodiments and modification, the description has been given of the example where the fuel cell module 1 is constituted by the fuel cell stack 10 and the reformer 12. However, the fuel cell module 1 may include another device such as an evaporator that generates heat during operation. Further, when, for example, reforming of fuel is not required according to the type or the like of fuel cells forming the fuel cell stack 10, the fuel cell module 1 does not need to include the reformer 12.

In the above-described embodiments and modification, as illustrated, for example, in FIG. 1, the heat insulating partition wall 18 is formed into the shape that partitions the section of the housing 16 generally straight linearly in section. However, the heat insulating partition wall 18 may be formed into a shape other than the generally straight linear shape in section. That is, the heat insulating partition wall 18 may be formed into a shape other than the generally straight linear shape in section as long as at least a part of its side defining the high temperature chamber H forms the wall portion (high temperature chamber wall portion 16a) of the housing 16.

Figure 7:
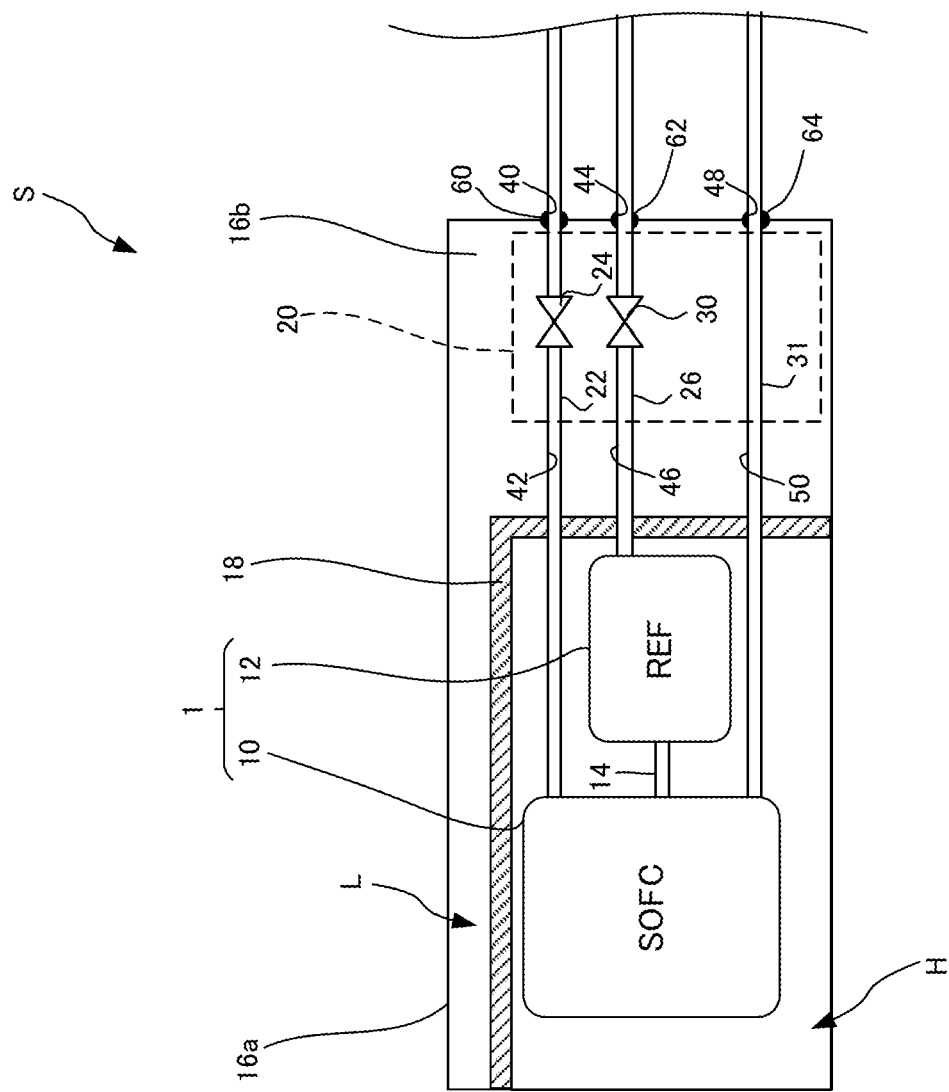
FIG. 7 is a diagram for explaining a further modified aspect of the fuel cell system.
Figure 8:
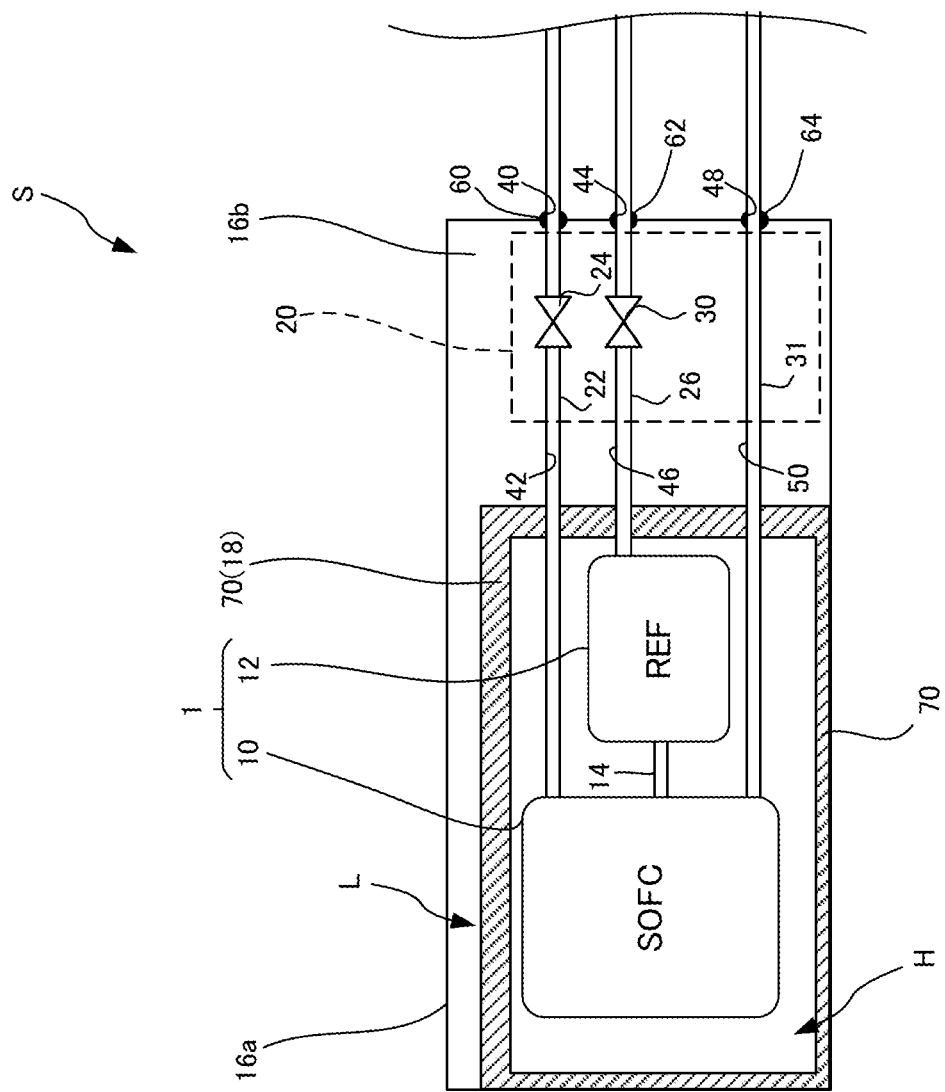
FIG. 8 is a diagram for explaining a further modified aspect of the fuel cell system.

For example, as illustrated in FIG. 7, the heat insulating partition wall 18 may be partially bent while ensuring the high temperature chamber wall portion 16a. Further, as illustrated in FIG. 8, in addition to the configuration of FIG. 7, it may be configured that the fuel cell module 1 is surrounded by a heat insulating coating member 70.

The invention claimed is:

1. A fuel cell system having a fuel cell module including a fuel cell, the fuel cell system comprising:
   a housing formed as an external casing which has a wall portion separating an inside space from an outside space, the wall portion internally defining a high temperature chamber in which the fuel cell module is disposed, and a low temperature chamber in which a gas supply system configured to supply a fuel and an oxidant to the fuel cell module is disposed; and a heat insulating partition wall partitioning a section of the housing to define the high temperature chamber and the low temperature chamber, the heat insulating partition wall formed with supply passages configured to allow supply of the fuel and the oxidant to the fuel cell module by the gas supply system, wherein an end portion of the heat insulating partition wall is in contact with a wall portion forming the housing.

2. The fuel cell system according to claim 1, wherein the low temperature chamber is formed by a space surrounded by the heat insulating partition wall and a low temperature chamber wall portion having higher heat transfer performance than the heat insulating partition wall.

3. The fuel cell system according to claim 1, wherein the housing has a watertight structure.

4. The fuel cell system according to claim 3, wherein:
the gas supply system includes a fuel pipe configured to supply the fuel to the fuel cell module from outside of the housing through the low temperature chamber and a supply passage, and an oxidant pipe configured to supply the oxidant to the fuel cell module from the outside of the housing through the low temperature chamber and a supply passage;
a low temperature chamber wall portion of the housing is formed with a fuel pipe passing hole through which the fuel pipe is inserted, and with an oxidant pipe passing hole through which the oxidant pipe is inserted; and
the fuel pipe passing hole and the oxidant pipe passing hole are provided with a watertight sealant.

5. The fuel cell system according to claim 4, wherein the watertight sealant is a packing or a gasket.

6. The fuel cell system according to claim 4, wherein a fuel supply device configured to send out the fuel to the fuel pipe and an oxidant supply device configured to send out the oxidant to the oxidant pipe are disposed outside the housing.

7. The fuel cell system according to claim 1, wherein a heat insulating coating member surrounding the fuel cell module is provided in the high temperature chamber.

8. The fuel cell system according to claim 7, wherein a partial region of the heat insulating coating member is configured as the heat insulating partition wall.

9. The fuel cell system according to claim 7, wherein the heat insulating coating member is provided in contact with a high temperature chamber wall portion of the housing.

10. The fuel cell system according to claim 1, wherein:
the low temperature chamber is configured such that a target heat balance condition under which a release heat quantity from the low temperature chamber to the outside of the housing becomes equal to or more than an inflow heat quantity from the high temperature chamber through the heat insulating partition wall is satisfied when a temperature of the low temperature chamber becomes equal to or more than a predetermined temperature; and
the predetermined temperature is an upper limit value of the temperature of the low temperature chamber that is allowed in terms of heat resistance in the gas supply system, or a value obtained by subtracting a predetermined margin from the upper limit value.

11. The fuel cell system according to claim 10, wherein at least one of an area of the low temperature chamber wall portion of the housing, a thermal conductivity of the low temperature chamber wall portion of the housing, a thickness of the low temperature chamber wall portion of the housing, an area of the heat insulating partition wall, a thermal conductivity of the heat insulating partition wall, or a thickness of the heat insulating partition wall is determined to satisfy the target heat balance condition.

12. The fuel cell system according to claim 11, wherein a ratio between the area of the low temperature chamber wall portion of the housing and the area of the heat insulating partition wall is determined to satisfy the target heat balance condition.

13. The fuel cell system according to claim 1, wherein the fuel cell is a solid oxide fuel cell.

14. A fuel cell system having a fuel cell module including a fuel cell, the fuel cell system comprising:
a housing including a high temperature chamber in which the fuel cell module is disposed, and a low temperature chamber in which a gas supply system configured to supply a fuel and an oxidant to the fuel cell module is disposed; and
a heat insulating partition wall partitioning a section of the housing to define the high temperature chamber and the low temperature chamber, the heat insulating partition wall formed with supply passages configured to allow supply of the fuel and the oxidant to the fuel cell module by the gas supply system,
wherein an end portion of the heat insulating partition wall is in contact with a wall portion forming the housing, wherein:
the low temperature chamber is configured such that a target heat balance condition under which a release heat quantity from the low temperature chamber to the outside of the housing becomes equal to or more than an inflow heat quantity from the high temperature chamber through the heat insulating partition wall is satisfied when a temperature of the low temperature chamber becomes equal to or more than a predetermined temperature; and
the predetermined temperature is an upper limit value of the temperature of the low temperature chamber that is allowed in terms of heat resistance in the gas supply system, or a value obtained by subtracting a predetermined margin from the upper limit value.

* * * * *